US009832575B2

United States Patent
Secall et al.

(10) Patent No.: US 9,832,575 B2
(45) Date of Patent: Nov. 28, 2017

(54) WIRELESS SOUND TRANSMISSION AND METHOD

(75) Inventors: Marc Secall, Constantine (CH); Timothée Jost, Auvernier (CH); Amre El-Hoiydi, Neuchâtel (CH)

(73) Assignee: Sonova, AG, Stäfa (CH)

( * ) Notice: Subject to any disclaimer, the term of this patent is extended or adjusted under 35 U.S.C. 154(b) by 307 days.

(21) Appl. No.: 14/373,140

(22) PCT Filed: Jan. 20, 2012

(86) PCT No.: PCT/EP2012/050847
§ 371 (c)(1),
(2), (4) Date: Jul. 18, 2014

(87) PCT Pub. No.: WO2013/107516
PCT Pub. Date: Jul. 25, 2013

(65) Prior Publication Data
US 2015/0125013 A1    May 7, 2015

(51) Int. Cl.
*H04J 3/00* (2006.01)
*H04R 25/00* (2006.01)
*G10L 19/16* (2013.01)
*G10L 19/24* (2013.01)
*G10L 19/008* (2013.01)
*H04W 88/18* (2009.01)
(Continued)

(52) U.S. Cl.
CPC .......... *H04R 25/554* (2013.01); *G10L 19/008* (2013.01); *G10L 19/167* (2013.01); *G10L 19/24* (2013.01); *G10L 19/04* (2013.01); *H04B 1/713* (2013.01); *H04B 2201/71361* (2013.01); *H04W 88/181* (2013.01)

(58) Field of Classification Search
None
See application file for complete search history.

(56) References Cited

U.S. PATENT DOCUMENTS 4,046,962 A    9/1977   Adelaar
5,570,363 A    10/1996  Holm
(Continued)

FOREIGN PATENT DOCUMENTS

EP    2 129 170 A1    12/2009
WO    99/16050 A1    4/1999
(Continued)

*Primary Examiner* — Mohammad Anwar
*Assistant Examiner* — Angel Brockman

(57) ABSTRACT

A system for providing sound to at least one user has at least one audio signal source, a transmission unit with a digital transmitter audio data packets from the audio signal source via a wireless digital audio link; at least one receiver unit having at least one digital receiver; and a hearing stimulator responsive to audio signals from the receiver unit. The transmission unit encodes the audio signal as audio data blocks distributed onto at least two audio data packets, one of which is a low-quality packet, and one of which is a high quality packet only a low-quality version of the audio signal being retrievable from the low-quality packets, and a high-quality version of the audio signal being retrievable from both the low-quality packets and the high-quality packets. The low-quality packets and the high-quality packets are transmitted in respective dedicated slots of a multiple access protocol frame.

25 Claims, 10 Drawing Sheets

(51) Int. Cl.
*G10L 19/04* (2013.01)
*H04B 1/713* (2011.01)

(56) References Cited

U.S. PATENT DOCUMENTS

| | | | |
|---|---|---|---|
| 7,272,556 | B1 | 9/2007 | Aguilar et al. |
| 8,014,451 | B2 | 9/2011 | Suh |
| 8,019,386 | B2 | 9/2011 | Dunn et al. |
| 8,488,822 | B2* | 7/2013 | Klemmensen ....... H04R 1/1008 381/312 |
| 2005/0195996 | A1 | 9/2005 | Dunn et al. |
| 2005/0196057 | A1 | 9/2005 | Suh |
| 2007/0161404 | A1* | 7/2007 | Yasujima .............. H04W 88/06 455/557 |
| 2008/0052068 | A1 | 2/2008 | Aguilar et al. |
| 2008/0130676 | A1* | 6/2008 | Liu ....................... H04W 16/14 370/445 |
| 2012/0308034 | A1* | 12/2012 | El-Hoiydi ............ H04B 7/0671 381/77 |

FOREIGN PATENT DOCUMENTS

| | | |
|---|---|---|
| WO | 2006/104634 A2 | 10/2006 |
| WO | 2008/098590 A1 | 8/2008 |
| WO | 2008/138365 A1 | 11/2008 |
| WO | 2010/078435 A2 | 7/2010 |

\* cited by examiner

WIRELESS SOUND TRANSMISSION AND METHOD

BACKGROUND OF THE INVENTION

Field of the Invention

The invention relates to a system and a method for providing sound to at least one user, wherein audio signals from an audio signal source, such as a microphone for capturing a speaker's voice, are transmitted via a wireless link to a receiver unit, such as an audio receiver for a hearing aid, from where the audio signals are supplied to means for stimulating the hearing of the user, such as a hearing aid loudspeaker.

Description of Related Art

Typically, wireless microphones are used by teachers teaching hearing impaired persons in a classroom (wherein the audio signals captured by the wireless microphone of the teacher are transmitted to a plurality of receiver units worn by the hearing impaired persons listening to the teacher) or in cases where several persons are speaking to a hearing impaired person (for example, in a professional meeting, wherein each speaker is provided with a wireless microphone and with the receiver units of the hearing impaired person receiving audio signals from all wireless microphones). Another example is audio tour guiding, wherein the guide uses a wireless microphone.

Another typical application of wireless audio systems is the case in which the transmission unit is designed as an assistive listening device. In this case, the transmission unit may include a wireless microphone for capturing ambient sound, in particular from a speaker close to the user, and/or a gateway to an external audio device, such as a mobile phone; here the transmission unit usually only serves to supply wireless audio signals to the receiver unit(s) worn by the user.

The wireless audio link often is an FM (frequency modulation) radio link operating in the 200 MHz frequency band. Examples for analog wireless FM systems, particularly suited for school applications, are described in European Patent Application EP 1 864 320 A1 and corresponding International Patent Application Nos. WO 2006/104634 A2 and WO 2008/138365 A1.

In recent systems the analog FM transmission technology is replaced by employing digital modulation techniques for audio signal transmission, most of them working on other frequency bands than the former 200 MHz band.

U.S. Pat. No. 8,019,386 B2 relates to a hearing assistance system comprising a plurality of wireless microphones worn by different speakers and a receiver unit worn at a loop around a listener's neck, with the sound being generated by a headphone connected to the receiver unit, wherein the audio signals are transmitted from the microphones to the receiver unit by using spread spectrum digital signals. The receiver unit controls the transmission of data, and it also controls the pre-amplification gain level applied in each transmission unit by sending respective control signals via the wireless link.

International Patent Application WO 2008/098590 A1 relates to a hearing assistance system comprising a transmission unit having at least two spaced apart microphones, wherein a separate audio signal channel is dedicated to each microphone, and wherein at least one of the two receiver units worn by the user at the two ears is able to receive both channels and to perform audio signal processing at ear level, such as acoustic beam forming, by taking into account both channels.

International Patent Application WO 2010/078435 A1 relates to a communication system comprising a plurality of transmission units comprising a microphone for capturing the respective speaker's voice and transmitting audio signal data packets to a receiver unit which may be connected to an earphone or to a hearing aid via a plug jack. The transmission units and the receiver unit form a wireless network using a pseudo random sequence frequency hopping scheme and having a master-slave architecture, wherein certain slots in each frame are individually attributed to each of the transmission units, so that each transmission unit is allowed to transmit audio signals in its dedicated slots and receive audio signals transmitted in the remaining slots. Synchronization information data may be transmitted by the master in a certain slot of the frame. Each audio data packet is redundantly transmitted three times in three dedicated slots, with the receiver unit only listening until a correct copy of the audio data packet has been received, so that, when already the first copy is correctly received, the receiver unit would not listen to the redundant copies. Audio signals are encoded by using sub-band ADPCM (Adaptive Differential Pulse Code Modulation), and the packets may be compressed from 16 bits to 4 bits using a G.722 encoder.

International Patent Application WO 99/16050 A1 relates to a scalable and embedded audio codec to be used for internet multimedia applications, wherein a single audio stream is provided for a plurality of devices which may have different sampling rates and/or bit rates. Lower bit rate output bit streams are embedded in higher bit rate bit streams in a manner that low quality audio devices may decode only part of the bit stream, while high quality audio devices may decode the full bit stream. The audio information corresponding to the lowest bit rate application may be inserted in a first priority packet, while secondary information may be inserted in second and third priority packets, so that devices operating only at the lowest bit rate can automatically separate the first priority packets from the remainder of the bit stream and use only these packets for signal reconstruction.

U.S. Pat. No. 5,570,363 relates to a personal computer based conferencing system using a scalable audio codec which provides for a single output audio stream which can be decoded by audio devices having different bandwidths and bit rates. Different data packets are produced for different devices, wherein the packets for higher quality audio devices include additional parts including the surplus of audio information.

U.S. Pat. No. 7,272,556 B1 relates to an audio codec providing compatibility over a range of communication devices operating at different sampling frequencies or bit rates, wherein the input signal is divided in different portions, at least one of which carries information sufficient to provide intelligible reconstruction of the input signal, and wherein separate information about other portions of the signal is encoded in an embedded manner, so that a smooth transition can be achieved from low bit rate to high bit rate applications. Thereby communication devices operating at different sampling rates or bit rates can extract corresponding information from the output bit stream. A similar audio codec is described in US 2008/0052068 A1.

European Patent Application EP 2 129 170 A1 relates to a system for wireless audio signal transmission from a TV-set to a hearing aid, wherein a G.722 audio codec is used.

Receiver devices for high fidelity audio reception, which support high sampling rates and thus offer large audio bandwidths as well as high resolution, typically require a relatively large power source (battery), so that the achievable degree of miniaturization is limited. On the other hand, receiver devices for speech quality audio reception, which support moderate sampling rates and thus offer a reduced audio bandwidth as well as lower resolution, can be designed for relatively low power consumption, so that a relatively high degree of miniaturization can be achieved.

In order to communicate with such different types of receiver devices, the transmission devices have to adapt their encoding scheme to the specific requirements of the receiver devices. Such adaptation of the audio quality to the requirements of a receiver device can be achieved, for example, by employing a sub-band ADPCM codec, such as the G.722 standard. This codec is particularly suited for low complexity, battery powered devices, since the computational requirements for encoding and decoding are reasonable. In addition, the delay introduced by this codec is low, which is particularly interesting for applications like wireless microphones, where lip synchronicity has to be guaranteed, as well as IEM (In-Ear-Monitoring) systems.

SUMMARY OF THE INVENTION

It is an object of the invention to provide for a wireless sound transmission system, wherein receiver units of different audio quality can be utilized while minimizing power requirements of the receiver units. It is also an object of the invention to provide for a corresponding wireless sound transmission method.

According to the invention, these objects are achieved by a system and a method as described herein.

The invention is beneficial in that a single audio stream is sufficient for supplying different types of receiver units, while the low quality receiver units do not suffer from increasing decoding complexity (which would be necessary for decoding the high quality audio signal) and increased power consumption (as a consequence of the increased decoding complexity). By requiring a single transmitted audio stream only, power consumption of the transmission unit can be kept low (since the transmission of several audio streams encoded at different quality in parallel can be avoided) and inefficient usage of the available transmission bandwidths due to redundancy of transmitted information can be avoided. These benefits result from encoding the audio signals in such a manner that each audio data block is distributed onto at least two audio data packets in such a manner that one of the packets is a low quality packet including an encoded low quality version of the audio signal and one of the packets is a high quality packet including the surplus of an encoded high quality version of the audio signal, wherein the low quality packets are transmitted in dedicated slots of a multiple access protocol frame and the high quality packets are transmitted in other dedicated slots of the multiple access protocol frame, and wherein each receiver unit is either adapted to receive and decode both the low quality packets and the high quality packets or is adapted to receive and decode the low quality packets only, while sleeping during the slots dedicated to the transmission of the high quality packets.

Preferably, an ADPCM codec is used. The multiple access protocol preferably is a TDMA protocol; however, also other multiple access protocols, such as FDMA and CDMA, may be used.

Hereinafter, examples of the invention will be illustrated by reference to the accompanying drawings.

DETAILED DESCRIPTION OF THE INVENTION

Figure 1:
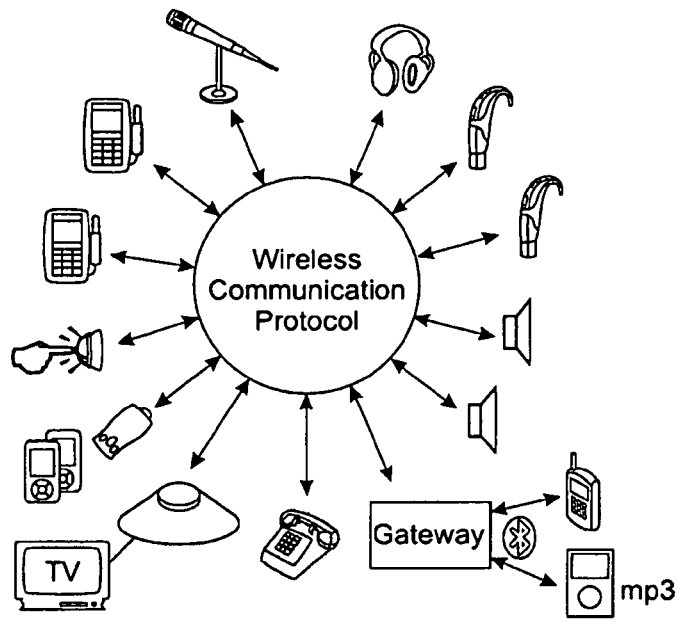
FIG. 1 is a schematic view of audio components which can be used with a system according to the invention.

As shown in FIG. 1, the device used on the transmission side may be, for example, a wireless microphone used by a speaker in a room for an audience; an audio transmitter having an integrated or a cable-connected microphone which are used by teachers in a classroom for hearing-impaired pupils/students; an acoustic alarm system, like a door bell, a fire alarm or a baby monitor; an audio or video player; a television device; a telephone device; a gateway to audio sources like a mobile phone, music player; etc. The transmission devices include body-worn devices as well as fixed devices. The devices on the receiver side include headphones, all kinds of hearing aids, ear pieces, such as for prompting devices in studio applications or for covert communication systems, and loudspeaker systems. The receiver devices may be for hearing-impaired persons or for normal-hearing persons. Also on the receiver side a gateway could be used which relays audio signal received via a digital link to another device comprising the stimulation means.

The system may include a plurality of devices on the transmission side and a plurality of devices on the receiver side, for implementing a network architecture, usually in a master-slave topology.

The transmission unit typically comprises or is connected to a microphone for capturing audio signals, which is typically worn by a user, with the voice of the user being transmitted via the wireless audio link to the receiver unit.

The receiver unit typically is connected to a hearing aid via an audio shoe or is integrated within a hearing aid.

In addition to the audio signals, control data is transmitted bi-directionally between the transmission unit and the receiver unit. Such control data may include, for example, volume control or a query regarding the status of the receiver unit or the device connected to the receiver unit (for example, battery state and parameter settings).

Figure 2:
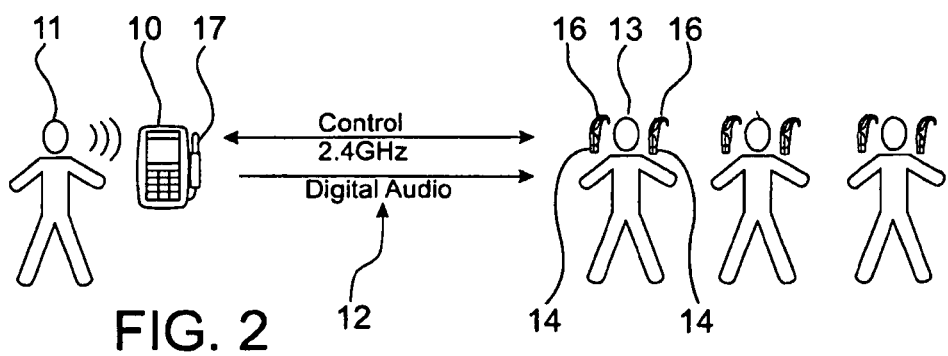
FIGS. 2 to 4 are schematic view of a use of various examples of a system according to the invention.

In FIG. 2, a typical use case is shown schematically, wherein a body-worn transmission unit 10 comprising a microphone 17 is used by a teacher 11 in a classroom for transmitting audio signals corresponding to the teacher's voice via a digital link 12 to a plurality of receiver units 14, which are integrated within or connected to hearing aids 16 worn by hearing-impaired pupils/students 13. The digital link 12 is also used to exchange control data between the transmission unit 10 and the receiver units 14. Typically, the transmission unit 10 is used in a broadcast mode, i.e., the same signals are sent to all receiver units 14.

Figure 3:
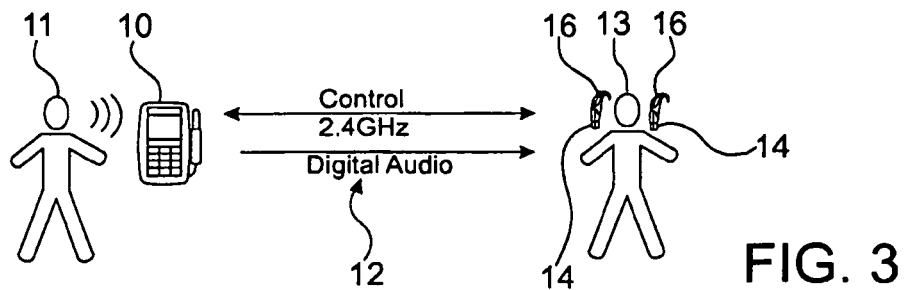

Another typical use case is shown in FIG. 3, wherein a transmission unit 10 having an integrated microphone is used by a hearing-impaired person 13 wearing receiver units 14 connected to or integrated within a hearing aid 16 for capturing the voice of a person 11 speaking to the person 13. The captured audio signals are transmitted via the digital link 12 to the receiver units 14.

Figure 4:
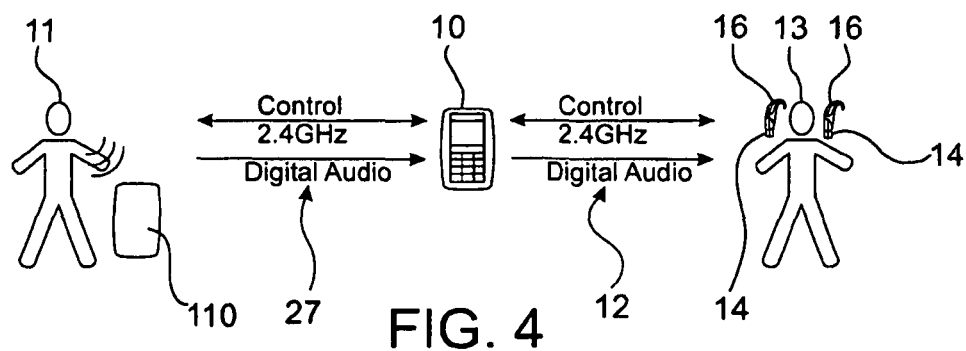

A modification of the use case of FIG. 3 is shown in FIG. 4, wherein the transmission unit 10 is used as a relay for relaying audio signals received from a remote transmission unit 110 to the receiver units 14 of the hearing-impaired person 13. The remote transmission unit 110 is worn by a speaker 11 and comprises a microphone for capturing the voice of the speaker 11, thereby acting as a companion microphone.

According to a variant of the embodiments shown in FIGS. 2 to 4, the receiver units 14 could be designed as a neck-worn device comprising a transmitter for transmitting the received audio signals via an inductive link to an ear-worn device, such as a hearing aid.

The transmission units 10, 110 may comprise an audio input for a connection to an audio device, such as a mobile phone, a FM radio, a music player, a telephone or a TV device, as an external audio signal source.

In each of such use cases, the transmission unit 10 usually comprises an audio signal processing unit (not shown in FIGS. 2 to 4) for processing the audio signals captured by the microphone prior to being transmitted.

Figure 5:
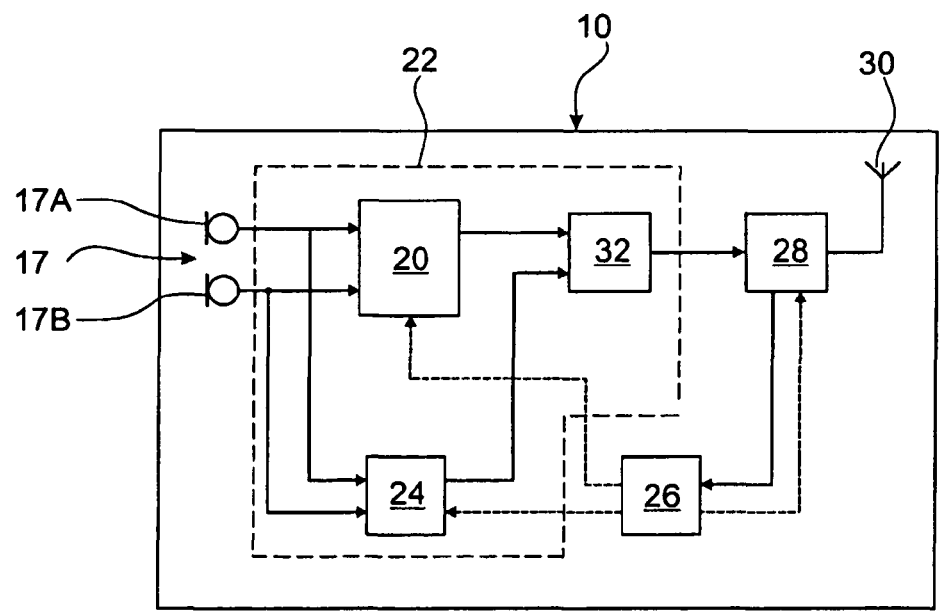
FIG. 5 is a block diagram of an example of a transmission unit to be used with the invention.

An example of a transmission unit 10 is shown in FIG. 5, which comprises a microphone arrangement 17 for capturing audio signals from the respective speaker's 11 voice, an audio signal processing unit 20 for processing the captured audio signals, a digital transmitter 28 and an antenna 30 for transmitting the processed audio signals as an audio stream formed of audio data packets. The audio signal processing unit 20 serves to compress the audio data using an appropriate audio codec which will be described in detail below. The compressed audio stream forms part of a digital audio link 12 established between the transmission units 10 and the receiver unit 14, which link also serves to exchange control data packets between the transmission unit 10 and the receiver unit 14, with such control data packets being inserted as blocks into the audio data. The transmission units 10 may include additional components, such as a voice activity detector (VAD) 24. The audio signal processing unit 20 and such additional components may be implemented by a digital signal processor (DSP) indicated at 22. In addition, the transmission units 10 also may comprise a microcontroller 26 acting on the DSP 22 and the transmitter 28. The microcontroller 26 may be omitted in case that the DSP 22 is able to take over the function of the microcontroller 26. Preferably, the microphone arrangement 17 comprises at least two spaced-apart microphones 17A, 17B, the audio signals of which may be used in the audio signal processing unit 20 for acoustic beamforming in order to provide the microphone arrangement 17 with a directional characteristic.

The VAD 24 uses the audio signals from the microphone arrangement 17 as an input in order to determine the times when the person 11 using the respective transmission unit 10 is speaking. The VAD 24 may provide a corresponding control output signal to the microcontroller 26 in order to have, for example, the transmitter 28 sleep during times when no voice is detected and to wake up the transmitter 28 during times when voice activity is detected. In addition, a control command corresponding to the output signal of the VAD 24 may be generated and transmitted via the wireless link 12 in order to mute the receiver units 14 or saving power when the user 11 of the transmission unit 10 does not speak. To this end, a unit 32 is provided which serves to generate a digital signal comprising the audio signals from the processing unit 20 and the control data generated by the VAD 24, which digital signal is supplied to the transmitter 28. The unit 32 acts to replace audio data by control data blocks. In addition to the VAD 24, the transmission unit 10 may comprise an ambient noise estimation unit (not shown in FIG. 5) which serves to estimate the ambient noise level and which generates a corresponding output signal which may be supplied to the unit 32 for being transmitted via the wireless link 12.

According to one embodiment, the transmission units 10 may be adapted to be worn by the respective speaker 11 below the speaker's neck, for example as a lapel microphone or as a shirt collar microphone.

Figure 6:
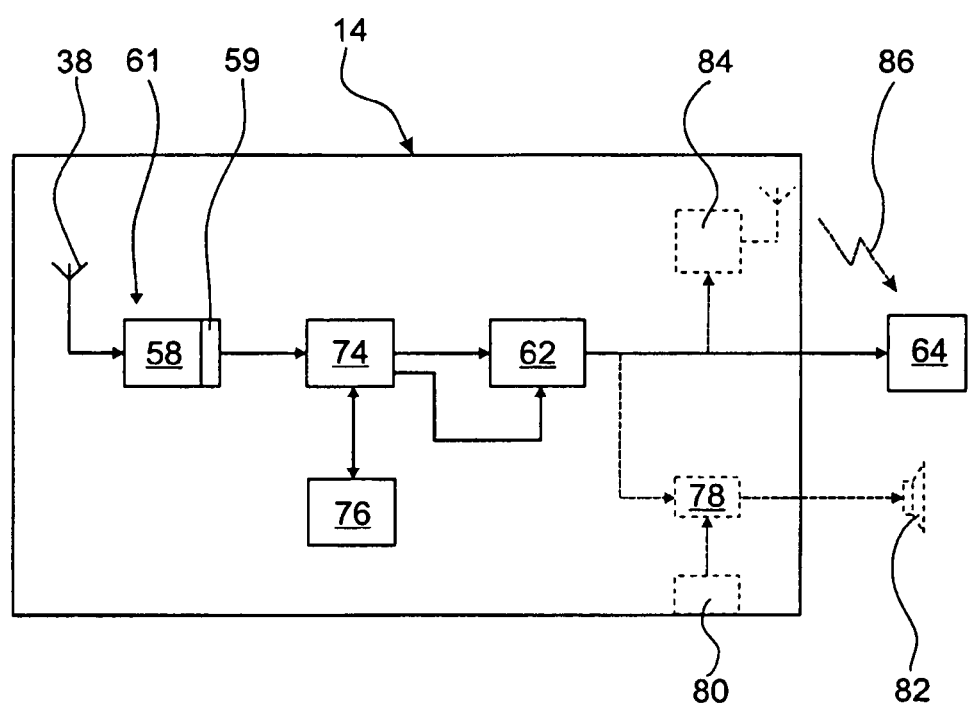
FIG. 6 is a block diagram of an example of a receiver unit to be used with the invention.

An example of a digital receiver unit 14 is shown in FIG. 6, according to which the antenna arrangement 38 is connected to a digital transceiver 61 including a demodulator 58 and a buffer 59. The signals transmitted via the digital link 12 are received by the antenna 38 and are demodulated in the digital radio receivers 61. The demodulated signals are supplied via the buffer 59 to a DSP 74 acting as processing unit which separates the signals into the audio signals and the control data and which is provided for advanced processing, e.g., equalization, of the audio signals according to the information provided by the control data. The processed audio signals, after digital-to-analog conversion, are supplied to a variable gain amplifier 62 which serves to amplify the audio signals by applying a gain controlled by the control data received via the digital link 12. The amplified audio signals are supplied to a hearing aid 64. The receiver unit 14 also includes a memory 76 for the DSP 74.

Rather than supplying the audio signals amplified by the variable gain amplifier 62 to the audio input of a hearing aid 64, the receiver unit 14 may include a power amplifier 78 which may be controlled by a manual volume control 80 and which supplies power amplified audio signals to a loudspeaker 82 which may be an ear-worn element integrated within or connected to the receiver unit 14. Volume control also could be done remotely from the transmission unit 10 by transmitting corresponding control commands to the receiver unit 14.

Another alternative implementation of the receiver maybe a neck-worn device having a transmitter 84 for transmitting the received signals via with an magnetic induction link 86 (analog or digital) to the hearing aid 64 (as indicated by dotted lines in FIG. 6).

In general, the role of the microcontroller 24 could also be taken over by the DSP 22. Also, signal transmission could be limited to a pure audio signal, without adding control and command data.

Figure 7:
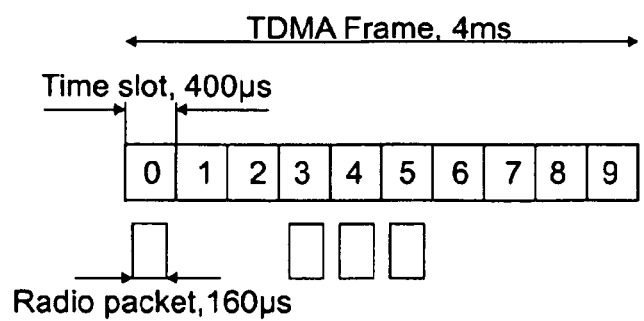
FIG. 7 is an example of a TDMA frame structure of the digital link of the invention.
Figure 8:
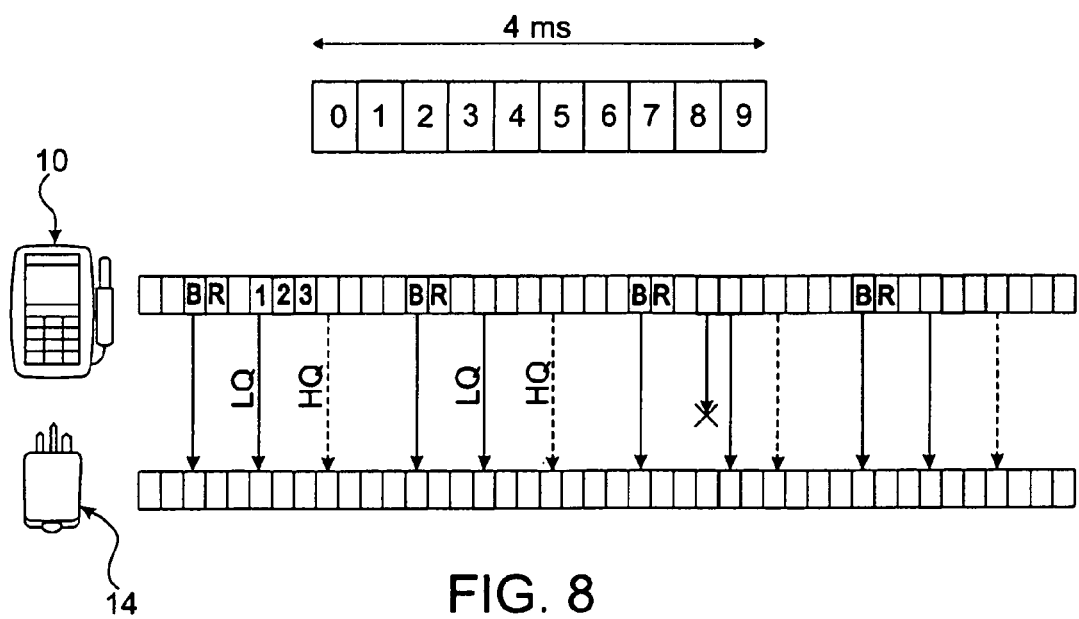
FIG. 8 is an illustration of an example of the protocol of the digital link used in a system according to the invention.

Some details of an example of the protocol of the digital link 12 will be discussed by reference to FIGS. 7 and 8. Typical carrier frequencies for the digital link 12 are 865 MHz, 915 MHz and 2.45 GHz, wherein the latter band is preferred. Examples of the digital modulation scheme are PSK/FSK, ASK or combined amplitude and phase modulations such as QPSK, and variations thereof (for example GFSK).

Data transmission may occur in the form of TDMA (Time Division Multiple Access) frames comprising a plurality (for example 10) of time slots, wherein in each slot one data packet may be transmitted. In FIG. 7, an example is shown wherein the TDMA frame has a length of 4 ms and is divided into 10 time slots of 400 μs, with each data packet having a length of 160 μs.

Preferably, a slow frequency hopping scheme is used, wherein each slot is transmitted at a different frequency according to a frequency hopping sequence calculated by a given algorithm in the same manner by the transmitter unit 10 and the receiver units 14, wherein the frequency sequence is a pseudo-random sequence depending on the number of the present TDMA frame (sequence number), a constant odd number defining the hopping sequence (hopping sequence ID) and the frequency of the last slot of the previous frame.

The first slot of each TDMA frame (slot 0 in FIG. 7) may be allocated to the periodic transmission of a beacon packet which contains the sequence number numbering the TDMA frame and other data necessary for synchronizing the network, such as information relevant for the audio stream, such as description of the encoding format, description of the audio content, gain parameter, surrounding noise level, etc., information relevant for multi-talker network operation, and optionally control data for all or a specific one of the receiver units.

The second slot (slot 1 in FIG. 7) may be allocated to the reception of response data from slave devices (usually the receiver units) of the network, whereby the slave devices can respond to requests from the master device through the beacon packet. At least some of the other slots are allocated to the transmission of audio data, wherein each audio data packet is repeated at least once, typically in subsequent slots. In the example shown in FIGS. 7 and 8 slots 3, 4 and 5 are used for three-fold transmission of a single audio data packet. The master device does not expect any acknowledgement from the slaves devices (receiver units), i.e., repetition of the audio data packets is done in any case, irrespective of whether the receiver unit has correctly received the first audio data packet (which, in the example of FIGS. 7 and 8, is transmitted in slot 3) or not. Also, the receiver units are not individually addressed by sending a device ID, i.e., the same signals are sent to all receiver units (broadcast mode).

Rather than allocating separate slots to the beacon packet and the response of the slaves, the beacon packet and the response data may be multiplexed on the same slot, for example, slot 0.

The audio data is compressed in the transmission unit 10 prior to being transmitted.

Each audio data packet comprises a start frame delimiter (SFD), audio data and a frame check sequence, such as CRC (Cyclic Redundancy Check) bits. Preferably, the start frame delimiter is a 5 bytes code built from the 4 byte unique ID of the network master. This 5 byte code is called the network address, being unique for each network.

In order to save power, the receivers 61 in the receiver unit 14 are operated in a duty cycling mode, wherein each receiver wakes up shortly before the expected arrival of an audio packet. If the receiver is able to verify (by using the CRC at the end of the data packet), the receiver goes to sleep until shortly before the expected arrival of a new audio data packet (the receiver sleeps during the repetitions of the same audio data packet), which, in the example of FIGS. 7 and 8, would be the first audio data packet in the next frame. If the receiver determines, by using the CRC, that the audio data packet has not been correctly received, the receiver switches to the next frequency in the hopping sequence and waits for the repetition of the same audio data packet (in the example of FIGS. 7 and 8, the receiver then would listen to slot 4 as shown in FIG. 8, wherein in the third frame transmission of the packet in slot 3 fails).

In order to further reduce power consumption of the receiver, the receiver goes to sleep already shortly after the expected end of the SFD, if the receiver determines, from the missing SFD, that the packet is missing or has been lost. The receiver then will wake up again shortly before the expected arrival of the next audio data packet (i.e., the copy/repetition of the missing packet).

According to the present invention, a codec, which typically is a sub-band ADPCM codec, is used, wherein the audio signal is encoded in such a manner that each audio data block is distributed onto at least two audio data packets in such a manner that one of the packets is a low quality packet representing an encoded low quality version of the audio signal and one of the packets is a high quality packet representing the surplus of an encoded high quality version of the audio signal with regard to the low quality version, so that by decoding of the low quality packets only a low quality version of the audio signal is retrievable, whereas by decoding of both the low quality packets and the high quality packets a high quality version of the audio signal is retrievable.

Preferably, the audio signal is split into at least two spectral sub-bands prior to encoding, with each sub-band being encoded by a separate encoder. Preferably, the low quality packets include only part of the sub-bands (hereinafter "basic sub-bands"), i.e., not all sub-bands, with the remaining sub-bands being included in the high quality packets, and with the low quality packets preferably including only the lowest sub-band(s).

Preferably, the low quality packets include only the most significant bits of the basic sub-bands, with the remaining, i.e., least significant, bits of the basic sub-bands being included in the high quality packets. Preferably, the audio signal in each of the basic sub-bands is encoded by a two-stage encoder comprising a first stage for generating the most significant bits included in the low quality packets, a unit for computing the residual quantization error of the first stage, and a second stage for encoding the computed residual quantization error of the first stage in order to generate the remaining, i.e., least significant, bits included in the high quality packets. The most significant bits of the basic sub-bands retrieved by decoding of the low quality packets are added to the least significant bits of the basic sub-bands retrieved by decoding the high quality packets in order to reconstruct the audio signal in the basic sub-bands.

Preferably, the low quality packets include only two sub-bands, while the high quality packets include one or two additional sub-bands.

Typically, the audio signal reconstructed by decoding both the low quality packets and the high quality packets has an increased bandwidth and/or an increased quantization resolution compared to the audio signal retrieved by decoding the low quality packets only. Preferably, the audio signal reconstructed by decoding both the low quality packets and the high quality packets has a higher quantization resolution in lower frequency sub-bands compared to higher frequency sub-bands.

Figure 9:
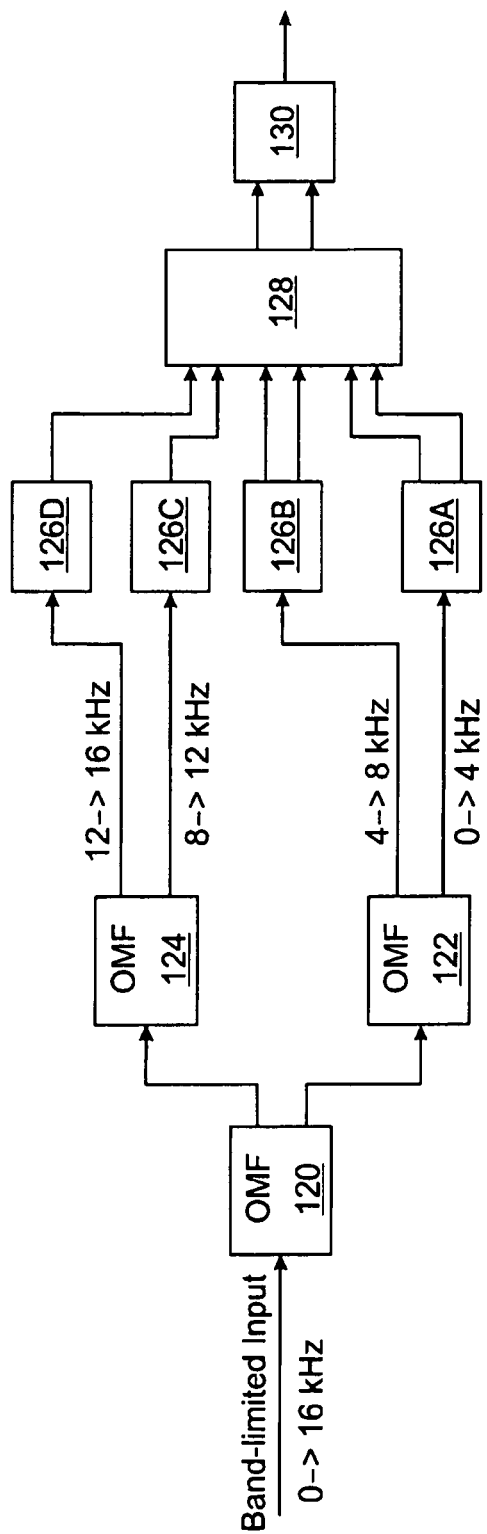
FIG. 9 is a block diagram of a first example of a unit for splitting the input audio signal into four sub-bands prior to encoding.
Figure 12:
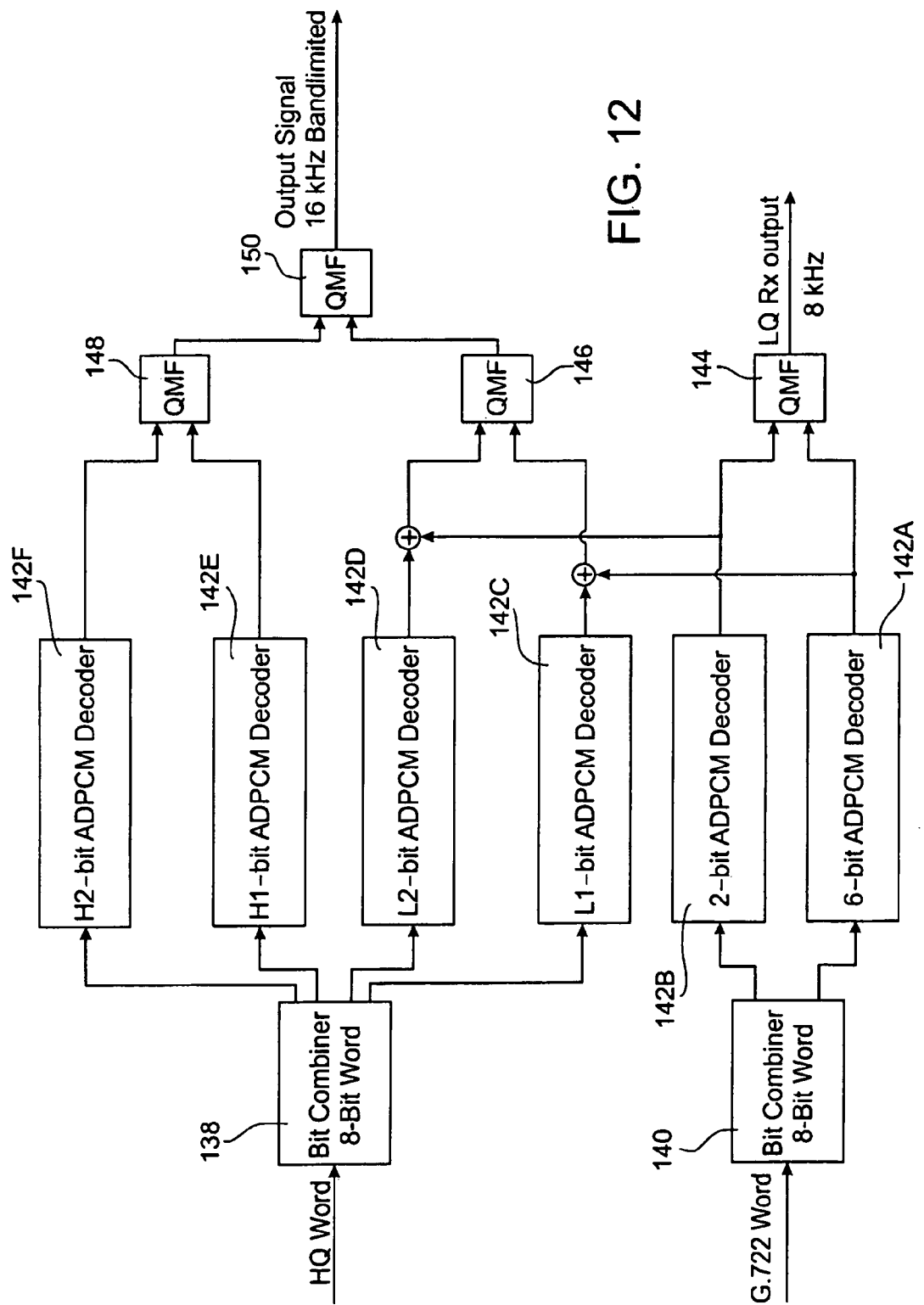
FIG. 12 is a block diagram of a first example of a decoder to be used with the present invention.

In FIGS. 9 and 12, an example is shown, wherein the audio signal is divided into four sub-bands, for example a first sub-band from 0 to 4 kHz, a second sub-band from 4 to 8 kHz, a third sub-band from 8 to 12 kHz and a fourth sub-band from 12 to 16 kHz. Such spectral splitting can be achieved, for example, as shown in FIG. 9, by a two-stage quadratic mirror filter (QMF) arrangement comprising a first QMF 120 for splitting the digitized audio input signal, which is limited to a band from 0 to 16 kHz, into two sub-bands, with each of these sub-bands being further split into two sub-bands by a second QMF 122 and a third QMF 124, respectively. Each of the sub-band signals is supplied to a separate encoder 126A, 126B, 126C and 126D, respectively, with the outputs of the encoders being supplied to a unit 128 which combines the input from the encoders into low quality (LQ) and high quality (HQ) words which are supplied as input to a unit 130 which produces an audio data output stream comprising the LQ words and HQ words.

The units 120, 122, 124, 126, 128 and 130 may be functionally implemented as part of the signal processing unit 20 of FIG. 5.

Figure 14:
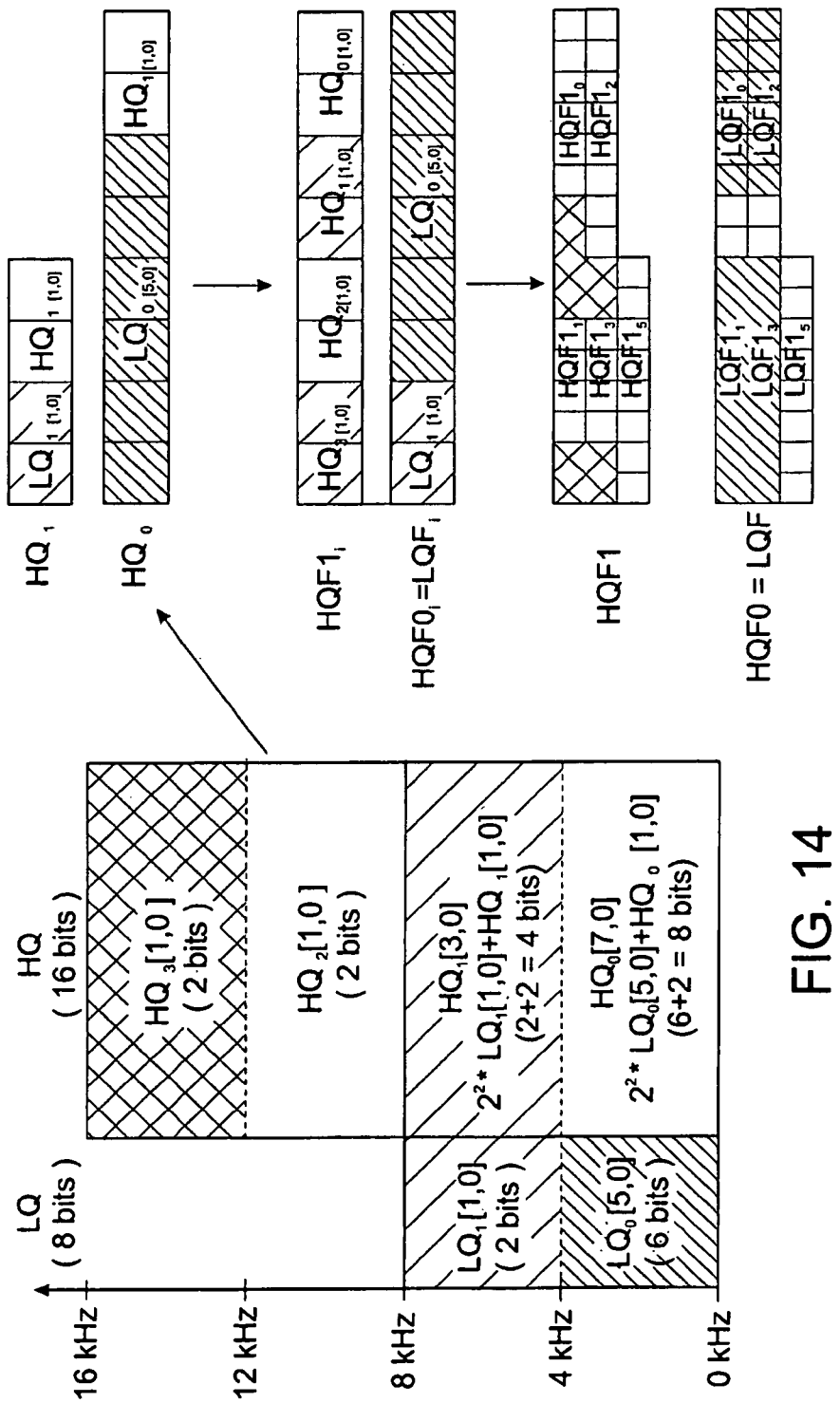
FIG. 14 is a schematic representation of an example of an audio codec to be used with the present invention.

According to the example illustrated in FIG. 14, in the case of a four sub-band encoder, the low quality version of the audio signal is encoded by 8 bits, with the first (lowest) sub-band being represented by 6 bits and the second (second lowest) sub-band being represented by two bits, whereas the high quality version of the audio signal is represented by 16 bits and hence comprises 8 bits in addition to the 8 bits of the low quality version. This 8 bit surplus consists of two additional bits in the first sub-band and two additional bits in the second sub-band, with the third (i.e., second highest) sub-band and the fourth (i.e., highest) sub-band being encoded by two bits each.

As shown in FIG. 14, the encoded audio signal thus is represented by a low quality packet consisting of the six most significant bits LQ0 of the first sub-band and the two most significant bits LQ1 of the second sub-band and a high quality packet consisting of the two least significant bits HQ0 of the first sub-band, the two least significant bits of HQ1 of the second sub-band, the two bits HQ2 of the third sub-band and the two bits HQ3 of the fourth sub-band.

The high quality packet (which is labeled "HQF1" in FIG. 14) thus consists of the surplus of audio information needed for the high quality version compared to the low quality version of the retrieved audio signal. The low quality packet thus has two functions: on the one hand, it contains all audio information necessary for retrieving a low quality version of the audio signal (therefore it is labeled "LQF" in FIG. 14), but it also may constitute a (low quality) part of the audio information necessary for retrieving the high quality version of the audio signal (accordingly, the low quality packet also is labeled "HQF0" in FIG. 14).

Consequently, by receiving and decoding both the low quality packet and the high quality packet, the high quality version of the audio signal can be retrieved, while by receiving and decoding only the low quality packet a low quality version of the audio signal can be retrieved.

The example shown of FIG. 14 is based on a four sub-band ADPCM codec with ¼ compression factor that serves both LQ receiver units, with a sampling rate of 16 kHz and 16 bit resolution, and high quality HQ receiver units, with a sampling rate of 32 kHz and 16 bit resolution.

For the LQ codec a 16 kHz signal is divided into 2 sub-bands. Every 2 samples of 16 bits are converted to 8 bits with 6 bits for the 0-4 kHz band ($LQ_0$) and 2 bits for the 4-8 kHz band ($LQ_1$). This results in a data rate of 8*16000/2=64 kb/s. For the transmission via the digital radio link a packet of 32*8 or 16*16 bits is sent every 4 ms. This packet is defined as the low quality frame (LQF).

For the HQ codec a 32 kHz signal is divided into 4 sub-bands. Every 2 samples of 16 bits are converted to 16 bits with 8 bits for the 0-4 kHz band ($HQ_0$), 4 bits for the 4-8 kHz band ($HQ_1$), 2 bits for the 8-12 kHz band ($HQ_2$) and 2 bits for the 12-16 kHz band ($HQ_3$). This results in a data rate of 16*32000/4=128 kb/s. For the transmission over the digital radio link 2 packets of 16*16 bits are sent every 4 ms. These packets are defined as the high quality frames ($HQF_0$ and $HQF_1$).

To maintain compatibility with the LQ codec, the most significant bits of $HQ_{band\ i}$ should be equal to $LQ_{band\ i}$:

$$HQ_{band\ i}[m-1;m-n]=LQ_{band\ i}[n-1;0],$$

where m and n are the number of bits of HQ respectively LQ quantizer for sub-band i.

To simplify access to the LQ data, the first frame (HQF0) contains only the most significant bits of $HQ_0$ and $HQ_1$ and, thus, corresponds exactly to the low quality frame (LQF). The second frame (HQF1) contains the least significant bits of $HQ_0$ and $HQ_1$ as well as $HQ_2$ and $HQ_3$. This way, the signal can be decoded by either a LQ decoder using only HQF0 or by a HQ decoder using both HQF0 and HQF1. Additionally, a HQ decoder should also be able to decode a LQF by putting "silence" encoded frames for the HQF1.

Figure 10:
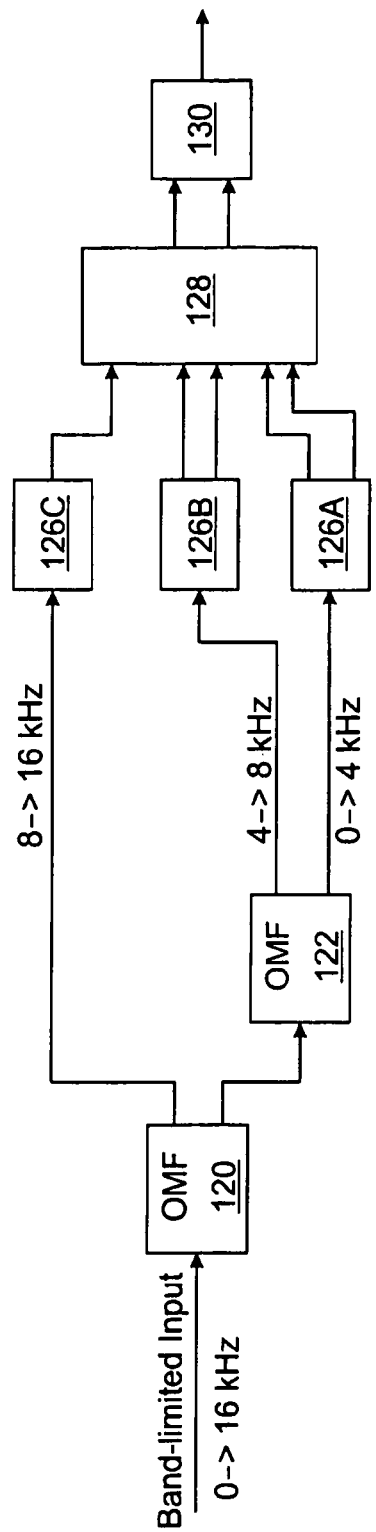
FIG. 10 is a view like FIG. 9, showing an example with three sub-bands.
Figure 11:
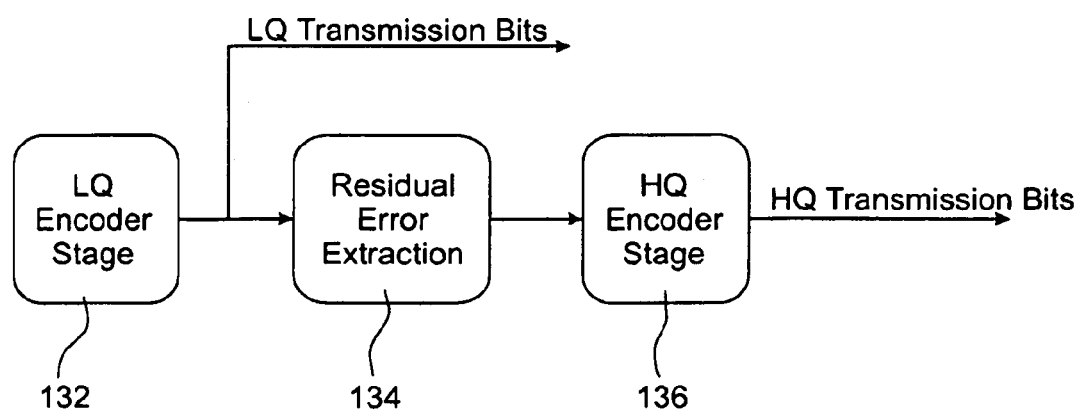
FIG. 11 is a block diagram of an example of an encoder to be used with the present invention.

In FIG. 11, an example of the type of encoder which may be used for encoding the first and second sub-band is shown (i.e., the encoder shown in FIG. 11 may be used as the encoders 126A and 126B). The encoder labeled "126A" in FIG. 9 or 10 comprises a low quality (LQ) unit 132 which preferably is G.722 compatible, a residual error extraction unit 134 and a high quality (HQ) unit 136. The LQ unit 132 serves to generate the six most significant bits of the first sub-band of the low quality packets (the corresponding output is labeled "LQ transmission bits" in FIG. 11), which are supplied to the unit 128.

In addition, the output of the LQ unit 132 is used by the residual error extraction unit 134 for extracting the residual quantization error resulting from such 6 bit quantization of the signal in the first sub-band. The output of the residual error extraction unit 134 is supplied to the HQ unit 136 which generates the two least significant bits of the signal in the first sub-band, which are supplied to the unit 128 for being included in the high quality packets (the output of the HQ unit is labeled "HQ transmission bits" in FIG. 11).

As already mentioned above, the encoder 126B used for encoding the second sub-band may have the same structure as the encoder 126A used for the first sub-band, with the LQ unit 132 then generating the two most significant bits of the second sub-band to be included in the low quality packets and the HQ unit 136 generating the two least significant bits of the second sub-band to be included in the high quality packets.

The encoders 126C and 126D used for encoding the third and fourth sub-band, respectively, do not need to have the two-stage structure of the encoders 126A and 126B; rather, the encoders 126C and 126D may consist of a unit like the HQ unit 136 only in order to supply the two bits encoding the third and fourth sub-band, respectively, to be included in the high quality packets.

An example of the four sub-band decoder structure to be implemented in the unit 74 of the receiver unit 14 is illustrated in FIG. 12. The received low quality packets (labeled "HQ word" in FIG. 12) are supplied to a bit combiner unit 138, whereas the received low quality packets (labeled "G.722 word" in FIG. 12) are supplied to a bit combiner unit 140. The bit combiners 138, 140 serve to separate the audio data of the low quality packets and the high quality packets into the contributions of the respective sub-bands.

Accordingly, the LQ bit combiner unit 140 generates a first output corresponding to the six most significant bits of the first sub-band and a second output corresponding to the two most significant bits of the second sub-band, which outputs are supplied to a 6 bit ADPCM decoder 142A and a 2 bit ADPCM decoder 142B. The respective decoded signals are supplied to a first QMF 144 which generates an 8 kHz low quality version of the audio signal.

The HQ bit combiner unit 138 generates a first output corresponding to the two least significant bits of the first sub-band, a second output corresponding to the two least significant bits of a second sub-band, a third output corresponding to the two bits of the third sub-band and a fourth output corresponding to the two bits of the fourth sub-band. These outputs are supplied to ADPCM decoders 142C, 142D, 142E and 142F, respectively.

The output signals provided by the HQ-decoders 142C to 142F are recombined by using a two-stage QMF arrangement. The output signals of the decoders 142E, 142F are supplied to a second QMF 148 and the output signals of the decoders 142C, 142D are supplied to a third QMF 146, with the output of the decoder 142A being added to the output of the decoder 142C and the output of the decoder 142B being added to the output of the decoder 142D, in order to completely reconstruct the high quality version of the first and second sub-band. The output of the QMF 146 and the QMF 148 are supplied to a fourth QMF 150 in order to reconstruct the 16 kHz high quality version of the audio signal.

While any high quality device seeking to retrieve the high quality version of the audio signal would have to employ the decoder structure shown in FIG. 12 apart from the LQ-QMF 144, the low quality devices seeking to retrieve only the 8 kHz low quality version of the audio signal would employ only the part of the decoder structure needed for decoding the low quality information, namely the unit 140, the decoders 142A, 142B and the LQ-QMF 144.

Figure 13:
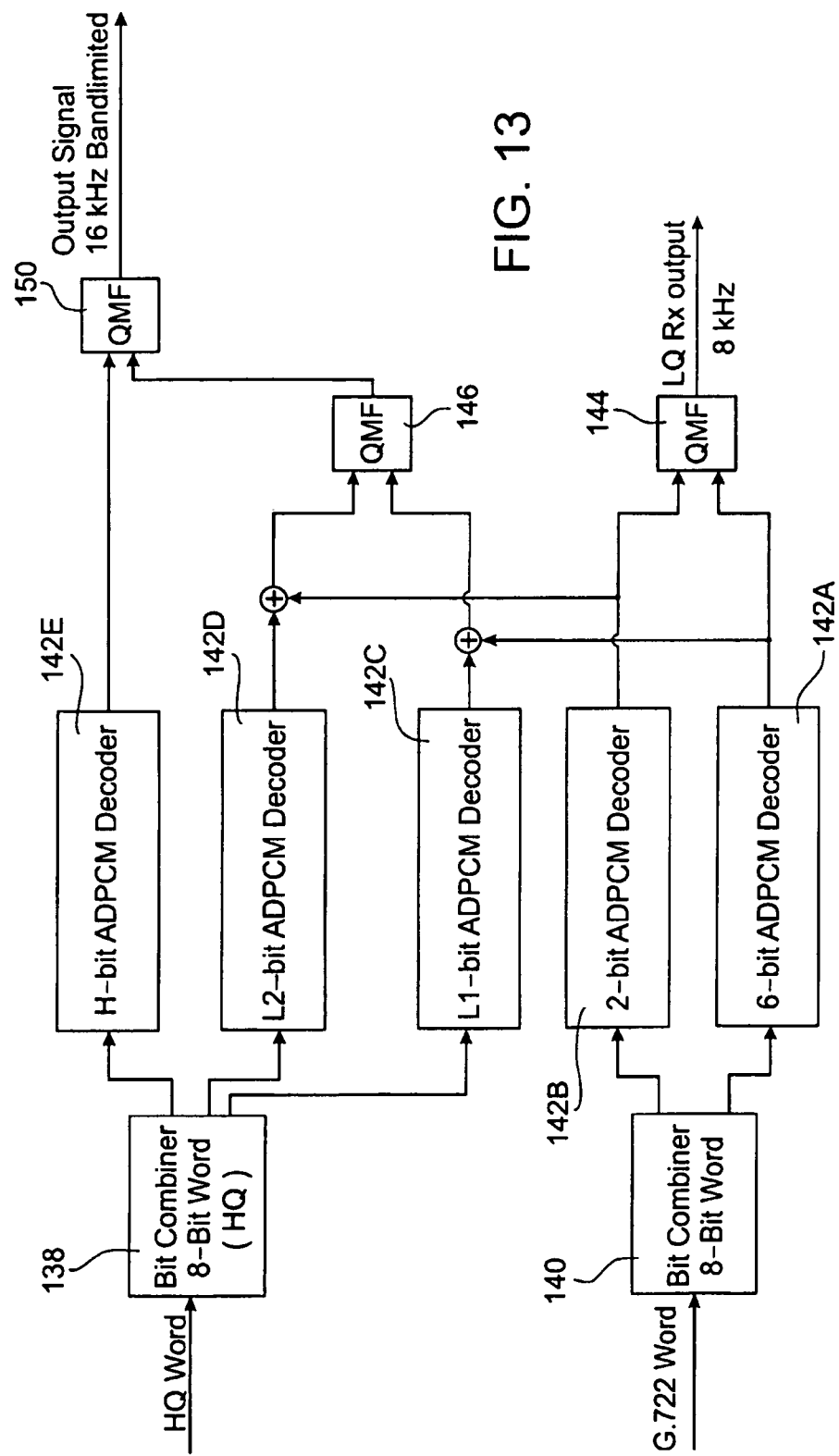
FIG. 13 is a view like FIG. 12 in which a second example of a decoder is shown.

In FIGS. 10 and 13, an example of the encoder arrangement and the decoder arrangement in case of the utilization of three sub-bands (rather than four sub-bands as in the example shown in FIGS. 9 and 12) is shown. In this case, the first and second sub-band correspond to the first and second sub-band of the four sub-band examples, whereas the third sub-band is from 8 to 16 kHz, with no fourth sub-band being foreseen. In this case, the encoder 126D and the third QMF 124 of FIG. 9 may be omitted. Accordingly, the decoder 142F and the QMF 148 of FIG. 12 may be omitted.

The benefit of such three sub-band embodiments is that one QMF computation and one sub-band encoder and decoder can be omitted, thereby simplifying the system. Further, if the allocated number of bits per sub-band is the same (for example two bits for the sub-band from 8 to 12 kHz and two bits for the sub-band from 12 to 16 kHz), then the achieved result is quite similar to the one obtained by allocating the same number of bits to the frequency band containing these sub-bands (for example, two bits for a sub-band from 8 to 16 kHz).

In order to keep the overall power consumption as low as possible, the low quality devices listen only to the transmission of the low quality packets, while sleeping during transmission of the high quality packets. For example, in the TDMA frame structure shown in FIGS. 7 and 8, the low quality packets may be transmitted in slots 3, 4 and 5, i.e., a first copy of the low quality packet is transmitted in slot 3, and redundant copies are transmitted in slots 4 and 5, respectively. The high quality packets are transmitted in slots 6, 7 and 8 in the same manner, i.e., a first copy is transmitted in slot 6, and redundant copies are transmitted in slots 7 and 8, respectively. In case that the receiver unit 14 shown in FIG. 8 is a high quality device, it would listen to both the transmission of the low quality packets and the high quality packets, i.e., it would listen at least during slots 3 and 6 (and during slots 4/5 and 7/8 only in case that the first copy is not correctly received). On the other hand, in case that the receiver unit 14 is a low quality device, it would listen to transmission of the low quality packets only, i.e., it would listen at least during slot 3 (and during slots 4/5 only in case that the copy in slot 3 is not correctly received), while it would be sleeping during transmission in slots 6, 7 and 8.

The invention claimed is:

1. A system for providing audio signals, comprising:
an audio signal source to provide an audio signal;
a transmission unit comprising a digital transmitter for applying a digital modulation scheme to transmit the audio signal as audio data packets from the audio signal source via a wireless digital audio link,
  wherein the transmission unit is configured to encode the audio signal in such a manner that each audio data block is distributed onto at least two audio data packets in such a manner that one of the at least two audio data packets is a low-quality packet including an encoded low-quality portion of the audio signal, and one of the at least two audio data packets is a high quality packet that includes an encoded high-quality portion of the audio signal with regard to the low quality portion, so that by decoding of the low-quality audio packet only a low-quality portion of the audio signal is retrievable, whereas by decoding of both the low-quality and the high-quality audio data packets a high-quality portion of the audio signal is retrievable, and
  wherein the transmission unit is configured to transmit the low-quality audio data packet in a dedicated slot of a multiple access protocol frame and configured to transmit the high-quality audio data packet in another dedicated slot of the multiple access protocol frame; and
a receiver unit for reception of a modulated audio signal from the transmission unit via the wireless digital audio link,
  wherein the receiver unit is configured to receive and decode the low-quality audio data packet while sleeping during the slot dedicated to the transmission of the high-quality audio data packet.

2. The system of claim 1, wherein the transmission unit is configured to split the audio signal into two spectral sub-bands prior to encoding,
wherein each sub-band is encoded by a separate encoder.

3. The system of claim 1, wherein the low-quality audio data packet includes only a lowest sub-band associated with the audio signal.

4. The system of claim 1, wherein the low-quality audio data packet includes only the most significant bits of a sub-band, with the remaining bits are included in the high-quality audio data packet.

5. The system of claim 1, wherein the transmission unit includes a two-stage encoder, wherein the two-stage encoder is configured to encode the low-quality audio data packet, wherein the two-stage encoder includes a first stage for generating the most significant bits included in the low-quality audio data packet, a unit for computing a residual quantization error of the first stage, and a second stage for encoding a computed residual quantization error of the first stage to generate remaining bits included in the high-quality audio data packet.

6. The system of claim 1, wherein the transmission unit includes a two-stage encoder, wherein the two-stage encoder is configured to encode the audio signal, wherein the two-stage encoder includes a first stage for generating said most significant bits included in the low-quality audio data packet, a unit for computing a residual quantization error of the first stage, and a second stage for encoding a computed residual quantization error of the first stage to generate remaining bits included in the high-quality audio data packet, and wherein the most significant bits are retrieved by decoding of the low-quality audio data and adding them to the least significant bits of retrieved by decoding of the high-quality audio data packet.

7. The system of claim 1, wherein the low-quality audio data includes only 2 sub-bands, wherein the high-quality audio data packet includes at least one additional sub-band compared to the low-quality audio data packet.

8. The system of claim 1, wherein the audio signal retrieved by decoding both the low-quality audio data packet and the high-quality audio data packet has an increased bandwidth and an increased quantization resolution compared to the audio signal retrieved by decoding only the low-quality audio data packet.

9. The system of claim 1, wherein the audio signal retrieved by decoding both the low-quality and the high-quality audio data packets has a higher quantization resolution in lower frequency sub-bands compared to higher frequency sub-bands.

10. The system of claim 1, wherein an Adaptive Differential Pulse-Code Modulation (ADPCM) codec is used.

11. The system of claim 10, wherein the low-quality audio data packet is transmitted at least twice in subsequent slots, in the same frame, without expecting acknowledgement messages from the receiver unit, and wherein the frames are structured for unidirectional broadcast transmission of the audio data packets.

12. The system of claim 1, wherein the low-quality and high-quality audio data packets are transmitted at a different frequency according to a frequency hopping sequence.

13. The system of claim 1, wherein the audio signal source is a microphone arrangement integrated into or connected to the transmission unit for capturing a speaker's voice.

14. The system of claim 1, wherein the transmission unit comprises an audio signal processing unit for processing the audio signals captured by the microphone arrangement prior to being transmitted.

15. The system of claim 1, wherein the transmission unit is configured to establish a wireless digital audio link at a carrier frequency in a 2.4 GHz industrial, scientific, and medical (ISM) radio band.

16. The system of claim 1, wherein the transmission unit configured to be coupled to an external audio device.

17. The system of claim 1, wherein the receiver unit is physically coupled to or integrated into an ear-worn device.

18. The system of claim 1, wherein the receiver unit is integrated within an audience loudspeaker.

19. The system of claim 1, wherein the multiple access protocol frame is a Time-Division multiple access (TDMA) frame.

20. A method for providing sound, the method comprising:

providing an audio signal from an audio signal source to a transmission unit comprising a digital transmitter for applying a digital modulation scheme;
encoding the audio signal,
wherein encoding includes encoding such that each audio data block is distributed onto at least two audio data packets in such a manner that one of the audio data packets is a low-quality audio data packet including an encoded low-quality portion of the audio signal, and one of the audio data packets is a high quality audio data packet including a high-quality portion of the audio signal with regard to a low-quality portion, so that by decoding of the low-quality audio data packet only the low-quality portion of the audio signal is retrieved, whereas by decoding of both the low-quality and the high-quality audio data packets a high-quality portion of the audio signal is retrieved;
transmitting the encoded audio signal via a digital wireless audio link from the transmission unit to a receiver unit,
wherein the low-quality audio data packet is transmitted in a dedicated slot of a multiple access protocol frame and the high-quality audio packet is transmitted in another dedicated slot of the multiple access protocol frame, and
wherein the receiver unit is configured to decode the low-quality audio data packet only while sleeping during the another slot dedicated to the transmission of the high-quality audio data packet;
decoding the transmitted audio signal; and
providing the decoded audio signal to a user.

21. The method of claim 20, wherein the low-quality audio data packet includes a first group of sub-bands and the high-quality audio data packet includes a second group of sub-bands, wherein the first group is different from the second group.

22. The method of claim 20, wherein the low-quality audio data packet includes only the lowest sub-band of the audio signal.

23. A hearing device, the device comprising:
a housing structure configured to be worn by a human,
a receiver unit physically coupled to the housing structure, wherein the receiver unit is configured to receive an audio signal from a transmission unit,
wherein the transmission unit is configured to encode the audio signal in such a manner that each audio data block is distributed onto at least two audio data packets in such a manner that one of the packets is a low-quality audio data packet including an encoded low-quality portion of the audio signal, and one of the packets is a high-quality audio data packet that includes a surplus of an encoded high-quality portion of the audio signal with regard to the low quality portion,
wherein the transmission unit is configured to transmit the low-quality audio data packet in dedicated slots of a multiple access protocol frame and to transmit the high-quality audio data packet in other dedicated slots of the multiple access protocol frame, and
wherein the receiver unit is configured to decode the low-quality audio data packet while sleeping during the slots dedicated to the transmission of the high-quality audio data packet.

24. The hearing device of claim 23, wherein the low-quality audio data packet includes only the most significant bits of a sub-band for the audio signal with remaining bits of the sub-band being included in the high-quality audio data packet.

25. The hearing device of claim 24, wherein the transmission unit includes a two-stage encoder comprising a first stage for generating most significant bits included in the low-quality audio data packet and a second stage to generate remaining bits included in the high-quality audio data packet.

* * * * *